United States Patent [19]

King, Jr. et al.

[11] 4,372,833

[45] Feb. 8, 1983

[54] PHOTOGENERATION OF ACTIVE FORMATE DECOMPOSITION CATALYSTS TO PRODUCE HYDROGEN FROM FORMATE AND WATER

[75] Inventors: Allen D. King, Jr.; Robert B. King; Earl L. Sailers, III, all of Athens, Ga.

[73] Assignee: University of Georgia Research Foundation, Inc., Athens, Ga.

[21] Appl. No.: 254,588

[22] Filed: Apr. 14, 1981

[51] Int. Cl.$^3$ ............................................. B01J 19/12
[52] U.S. Cl. ............................................. 204/157.1 R
[58] Field of Search .............................. 204/157.1 W

[56] References Cited

U.S. PATENT DOCUMENTS 4,105,517  8/1978  Frosch ..................... 204/157.1 W

FOREIGN PATENT DOCUMENTS 49-27952  7/1974  Japan ........................ 204/157.1 W

*Primary Examiner*—Howard S. Williams
*Attorney, Agent, or Firm*—William C. Lee, III

[57] ABSTRACT

A process for producing hydrogen from formate and water by photogenerating an active formate decomposition catalyst from transition metal carbonyl precursor catalysts at relatively low temperatures and otherwise mild conditions is disclosed. Additionally, this process may be expanded to include the generation of formate from carbon monoxide and hydroxide such that the result is the water gas shift reaction.

12 Claims, No Drawings

PHOTOGENERATION OF ACTIVE FORMATE DECOMPOSITION CATALYSTS TO PRODUCE HYDROGEN FROM FORMATE AND WATER

BACKGROUND OF THE INVENTION

The Government has rights in this invention pursuant to Contract No. DE-AS09-76ER-0093, formerly EY-76-S-09-0933, awarded by the U.S. Depart. of Energy.

This invention relates to photogeneration of active formate decomposition catalysts. More specifically, this invention is directed to producing hydrogen and carbon dioxide from formate and water by photogenerating an active formate decomposition catalyst. Additionally the process may be expanded to generate formate from carbon monoxide and hydroxide. These two reactions when combined constitute the water gas shift reaction.

Current technology utilizes steam as a reactant in the water gas shift reaction as shown in equation (1):

$$CO(g) + H_2O(g) \rightleftharpoons H_2(g) + CO_2(g) \tag{1}$$

This reaction is generally carried out in two stages with the first stage utilizing an iron oxide-chromium oxide catalyst operating at 315°–485° C. followed by a second stage which uses a zinc oxide-copper oxide catalyst system operating at lower temperatures, 175° C.–350° C. The incorporation of a second stage operating at a lower temperature is advantageous because the reaction is exothermic so that lower temperatures favor hydrogen formation.

In recent years considerable attention has been directed towards conducting the water gas shift reaction under still milder conditions at temperatures between 100° C. and 200° C. with water present in a condensed state. This reaction is shown in equation (2):

$$CO(g) + H_2O(l) \rightleftharpoons H_2(g) + CO_2(g) \tag{2}$$

While highly favored from a free energy standpoint, this reaction unlike reaction (1) is mildly endothermic; thus, not only can a savings in energy be realized by operating at these lower temperatures, but in addition the mild endothermicity of equation (2) offers an advantage from an engineering standpoint in that any isothermal reactor using condensed water as a reactant will have reduced cooling demands in comparison to conventional systems. With the reactant water being present in a condensed state, homogeneous catalysts afford a convenient means for accelerating this reaction. Since the products, hydrogen and carbon dioxide, are gases, the separation of catalyst from product poses no problem. Under basic conditions not only do a wide variety of commonly available transition metal carbonyls exhibit catalytic activity towards the water gas shift reaction, but also one class in particular, the hexacarbonyls derived from metals belonging to Group VIb, specifically chromium, molybdenum, and tungsten, generate extremely sulfur tolerant catalyst systems. A recent detailed study of reaction characteristics of these Group VIb transition metal carbonyl catalysts shows that they share a common characteristic, extreme thermal stability. In addition, the catalytic activities of these Group VIb carbonyls are quite similar. Regardless of which Group VIb carbonyl is used, the rate of hydrogen production is (a) first order with respect to the amount of metal hexacarbonyl present, (b) inversely proportional to carbon monoxide pressure, and (c) proportional to base concentration. In addition, material balance considerations show that before the onset of the water gas shift reaction a relatively rapid chemical reaction occurs in which carbon monoxide reacted with the hydroxide in the basic solution to produce formate, resulting in a quantitative conversion of hydroxide to formate.

A mechanism is shown in the following equations, M is chromium, molybdenum, or tungsten, which satisfactorily explains these observations:

$$CO + OH^- \rightarrow HCO_2^- \tag{3a}$$

$$M(CO)_6 \rightleftharpoons M(CO)_5 + CO \tag{3b}$$

$$M(CO)_5 + HCO_2^- \rightarrow HCO_2M(CO)_5^- \tag{3c}$$

$$HCO_2M(CO)_5^- \rightarrow HM(CO)_5^- + CO_2 \tag{3d}$$

$$HM(CO)_5^- + H_2O \rightarrow H_2M(CO)_5 + OH^- \tag{3e}$$

$$H_2M(CO)_5 \rightarrow M(CO)_5 + H_2 \tag{3f}$$

Equation (3a) of this mechanism represents the production of formate from carbon monoxide and hydroxide present in the basic solution. This reaction proceeds very rapidly at temperatures in excess of 100° C. The second equation of this mechanism, (3b), represents the thermal dissociation of the precursor catalyst, the Group VIb transition metal hexacarbonyl, into the corresponding pentacarbonyl. The Group VIb transition metal pentacarbonyl is the catalytically active species which accelerates the catalytic cycle, equations (3c) through (3f), by which formate is decomposed in the presence of water into carbon dioxide and hydrogen while regenerating hydroxide for further formate production. Although the decomposition temperature may vary somewhat from one solvent system to the next, generally bicarbonate is found to be unstable at temperatures in excess of ~70° C. so that the carbon dioxide produced in equation (3d) does not tie up the hydroxide produced in equation (3e). Thus at temperatures of 100° C., equations (3a) through (3f) are catalytic in base as well as the Group VIb transition metal pentacarbonyl with the overall reaction being that of the water gas shift reaction utilizing water in a condensed state, equation (2). No measurable hydrogen production is observed with either non-illuminated or photolyzed solutions of tungsten hexacarbonyl when sodium formate is replaced by potassium hydroxide. The reaction of hydroxide with carbon monoxide to produce formate, equation (3a) is very slow at a temperature of 75° C. The negative results obtained with potassium hydroxide serve to eliminate from consideration any catalytic sequence involving direct base attack on tungsten hexacarbonyl which constitutes an alternate means for producing $CO_2$ and $HW(CO)_5$, both of which are part of the catalytic cycle depicted by equations (3c) through (3f). Such a mechanism has been invoked for the water gas shift reaction catalyzed by iron pentacarbonyl (Kang, H., Mauldin, C. H., Cole, T., Slegeir, W., Cann, K., and Pettit, R., J. Am. Chem. Soc. 99, 8323, 1977 and King, A. D., Jr., King, R. B., and Yang, D. B., J. Am. Chem. Soc. 102, 1028, 1980). A reaction sequence involving base attack would not be expected to undergo any acceleration when photolyzed, and recent unpublished studies in this laboratory show this to be the case with iron pentacarbonyl. The recent mechanistic studies involving the Group VIb transition metal hexacarbonyls referred to above suggest that the catalytic sequence proceeds through a thermal dissociation mechanism; thus photodissociation can be substituted for thermal dissociation.

According to the thermal dissociation mechanism given above, equations (3a) through (3f), the true catalytic species, the Group VIb transition metal pentacarbonyl wherein the metal is chromium, molybdenum, or tungsten, is derived from the thermal dissociation of the corresponding hexacarbonyl precursor catalyst as shown in equation (3b). However, this same reaction, equation (3b), is also known to occur photolytically with a very high efficiency, quantum yield $\phi \approx 1$, using near ultraviolet light (Geoffroy, G. L. and Wrighton, M. S., *Organometallic Photochemistry*, Academic Press, New York, 1979).

It is an object of the present invention to produce hydrogen from formate and water by photogenerating an active formate decomposition catalyst. Additionally, the process may be expanded to generate formate from carbon monoxide and hydroxide, the sum of the two reactions being the water gas shift reaction.

It is a further object to provide a novel catalytic process for producing hydrogen at relatively low temperatures and otherwise mild conditions.

These and other objects, aspects and advantages of this invention will become apparent from a consideration of the accompanying specification and claims.

SUMMARY OF THE INVENTION

In accordance with the above objects, the present invention substitutes photogeneration of an active formate decomposition catalyst from a precursor transition metal carbonyl for the thermal dissociation as shown in equation (3b) of the water gas shift reaction mechanism:

$$CO + OH^- \rightarrow HCO_2^- \tag{3a}$$

$$M(CO)_6 \rightleftharpoons M(CO)_5 + CO \tag{3b}$$

$$M(CO)_5 + HCO_2^- \rightarrow HCO_2M(CO)_5^- \tag{3c}$$

$$HCO_2M(CO)_5^- \rightarrow HM(CO)_5^- + CO_2 \tag{3d}$$

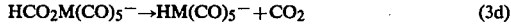

$$HM(CO)_5^- + H_2O \rightarrow H_2M(CO)_5 + OH^- \tag{3e}$$

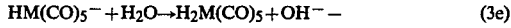

$$H_2M(CO)_5 \rightarrow M(CO)_5 + H_2 \tag{3f}$$

Said catalyst is a homogeneous catalyst. In the above equations a transition metal carbonyl such as chromium pentacarbonyl, molybdenum pentacarbonyl, and tungsten pentacarbonyl is the active catalyst. Active catalysts are not restricted to metal pentacarbonyls suggested above and may include other species generated from precursor species such as ($\eta^6$-arene)-metal tricarbonyls wherein the metal is a transition metal such as chromium, molybdenum, or tungsten. This provides facile entry into the catalytic cycle for the decomposition of formate, equations (3c) through (3f), thus leading to enhanced catalytic activity at low temperatures. With photogeneration of an active formate decomposition catalyst, the following equations, (3b1) and (3b2):

$$M(CO)_6 \xrightarrow{h\nu} M(CO)_5 + CO \tag{3b1}$$

$$M(CO)_5 + CO \rightarrow M(CO)_6 \tag{3b2}$$

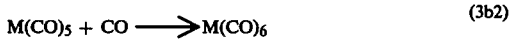

replace (3b) allowing for light to photolyze the parent transition metal carbonyl while nevertheless allowing carbon monoxide to compete with formate for the catalytically active pentacarbonyl species just as is the case of equation (3b) of the strictly thermal reaction shown in equations (3a) through (3f) above. Thus, transition metal hexacarbonyls can be transformed photochemically into active catalysts for the water gas shift reaction. The substitution of light for heat offers a means for achieving high levels of catalytic activity towards the water gas shift reaction at low temperatures, for example, 100° C. Sunlight is a satisfactory source of light for this. Finally photogenerated catalysts serve to decompose formate produced by reaction of carbon monoxide with base according to a series of steps given by equations (3a), (3b1), (3b2), and (3c) through (3f).

DESCRIPTION OF THE PREFERRED EMBODIMENTS

In the preferred embodiments the transition metal carbonyl catalytic precursor, wherein the metal is chromium, molybdenum, or tungsten, and formate in a solution of water and solvent such as a hydroxylic solvent or transparent water/oil microemulsions, wherein the hydroxylic solvent is 2-ethoxy ethanol (Cellosolve), 2-(2-ethoxy ethoxy) ethanol (Methyl Carbitol), propylene glycol monomethyl ether (UCAR Solvent LM), or triethyl glycol, maintained under oxygen free conditions at a temperature of 45° C. and above, are exposed to sunlight, wherein the active formate decomposition catalyst is photogenerated from the transition metal catalytic precursor as shown in equation (3b1):

$$M(CO)_6 \xrightarrow{h\nu} M(CO)_5 + CO \tag{3b1}$$

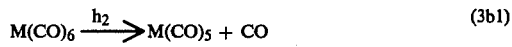

Formate reacts with the active formate decomposition catalyst to form an intermediate formatopentacarbonylmetallate as shown in equation (3c):

$$M(CO)_5 + HCO_2^- \rightarrow HCO_2M(CO)_5^- \tag{3c}$$

Once formed available evidence indicates that the formatopentacarbonylmetallate decomposes according to the sequence of equations (3d) through (f):

$$HCO_2M(CO)_5^- \rightarrow HM(CO)_5^- + CO_2 \tag{3d}$$

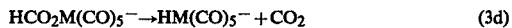

$$HM(CO)_5^- + H_2O \rightarrow H_2M(CO)_5 + OH^- \tag{3e}$$

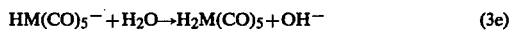

$$H_2M(CO)_5 \rightarrow M(CO)_5 + H_2 \tag{3f}$$

thus, producing hydrogen and carbon dioxide. However, the solution once photolyzed maintains characteristics of a true thermal catalyst retaining catalytic activity over periods of several hours in the dark. Eventually, the solutions lose activity. Solutions of molybdenum carbonyl appear to be the least stable and catalytically active of the three preferred systems. Formate can be generated from carbon monoxide and hydroxide in a basic solution and this reaction when combined with any of the above described preferred embodiments constitutes the water gas shift reaction.

EXAMPLE I

Photo-Assisted Decomposition of Formate Using Cr(CO)$_6$

In Example I 200 ml. of 25% H$_2$O-75% Cellosolve V/V, 0.0263 g Cr(CO)$_6$, and 2.7000 g NaHCO$_2$, at a temperature of approximately 45° C. is exposed to sunlight. Hydrogen and carbon dioxide production are shown in Table I below.

TABLE I

Photo-Assisted Decomposition of Formate Using Cr(CO)$_6$

| Status | Time | T (°C.) | ml H$_2$ | ml CO$_2$ |
|---|---|---|---|---|
| Dark | 2:15 p.m. | 38 | 0.018 | |
| " | 2:25 p.m. | 37 | 0.033 | |
| " | 2:30 p.m. | 36 | 0.042 | |
| Reaction taken out into sunlight at 2:35 p.m. | | | | |
| Illuminated | 2:40 p.m. | 39 | 0.066 | |
| " | 2:50 p.m. | 40 | 0.160 | |
| " | 3:00 p.m. | 40 | 0.307 | |
| " | 3:05 p.m. | 41 | | 0.338 |
| " | 3:10 p.m. | 42 | 0.414 | |
| " | 3:20 p.m. | 43 | 0.674 | |
| " | 3:30 p.m. | 44 | 0.954 | |
| " | 3:35 p.m. | 44 | | 0.725 |
| " | 4:00 p.m. | 45 | 2.27 | |
| " | 4:05 p.m. | 45 | | 1.15 |
| " | 4:20 p.m. | 46 | 3.40 | |
| " | 4:40 p.m. | 46 | 4.76 | |
| " | 5:00 p.m. | 46 | 6.74 | |
| " | 5:20 p.m. | 45 | 8.93 | |
| " | 5:35 p.m. | 45 | | 1.87 |
| " | 5:40 p.m. | 45 | 10.7 | |
| " | 6:00 p.m. | 45 | 12.6 | |
| " | 6:05 p.m. | 45 | | 2.05 |
| " | 6:20 p.m. | 46 | 13.8 | |
| " | 6:25 p.m. | 46 | | 2.17 |

EXAMPLE II

Photo-Assisted Decomposition of Formate Using Cr(CO)$_6$

In Example II 200 ml. of 25% H$_2$O-75% Cellosolve V/V, 0.0264 g Cr(CO)$_6$, and 2.6999 g NaHCO$_2$, at a temperature of approximately 67° C. is exposed to sunlight. Hydrogen production is shown in Table II below:

TABLE II

Photo-Assisted Decomposition of Formate Using Cr(CO)$_6$

| Status | Time | T (°C.) | ml H$_2$ |
|---|---|---|---|
| Dark | 11:48 a.m. | 70 | 0.035 |
| " | 12:05 p.m. | 74 | 0.162 |
| " | 12:17 p.m. | 75 | 0.377 |
| " | 12:45 p.m. | 73 | 1.28 |
| Reaction taken out into the sunlight at 12:50 p.m. | | | |
| Illuminated | 1:06 p.m. | 69 | 10.4 |
| " | 1:12 p.m. | 67 | 15.8 |
| " | 1:25 p.m. | 66 | 20.4 |
| " | 1:30 p.m. | 68 | 22.8 |
| " | 1:52 p.m. | 63 | 30.2 |
| " | 2:02 p.m. | 70 | 30.9 |
| " | 2:27 p.m. | 74 | 39.1 |
| " | 2:55 p.m. | 73 | 44.3 |

EXAMPLE III

Photo-Assisted Decomposition of Formate Using Cr(CO)$_6$

In Example III 200 ml of 25% H$_2$O-75% Cellosolve V/V, 0.0268 g Cr(CO)$_6$, and 2.6997 g NaHCO$_2$, at a temperature of approximately 87° C. is exposed to sunlight. Hydrogen production is shown in Table III below.

TABLE III

Photo-Assisted Decomposition of Formate Using Cr(CO)$_6$

| Status | Time | T (°C.) | ml H$_2$ |
|---|---|---|---|
| Dark | 2:20 p.m. | 93 | 0.114 |
| " | 2:30 p.m. | 90 | 0.40 |
| " | 2:40 p.m. | 89 | 0.74 |
| Reaction taken out into sunlight at 2:45 p.m. | | | |
| Illuminated | 2:50 p.m. | 87 | 1.00 |
| " | 3:07 p.m. | 87 | 25.7 |
| " | 3:15 p.m. | 87 | 36.6 |
| " | 3:25 p.m. | 89 | 41.8 |
| " | 3:32 p.m. | 88 | 45.1 |
| " | 3:40 p.m. | 88 | 46.3 |
| " | 3:50 p.m. | 88 | 48.5 |
| " | 4:00 p.m. | 88 | 51.2 |
| " | 4:12 p.m. | 88 | 52.7 |
| " | 4:35 p.m. | 89 | 56.7 |
| " | 4:50 p.m. | 89 | 57.4 |
| " | 5:10 p.m. | 88 | 57.4 |
| " | 5:30 p.m. | 88 | 58.1 |

EXAMPLE IV

Photo-Assisted Decomposition of Formate Using Mo(CO)$_6$

In Example IV 200 ml. of 25% H$_2$O-75% Cellosolve V/V, 0.0315 g Mo(CO)$_6$, and 2.6990 g NaHCO$_2$, at a temperature of approximately 52° C. is exposed to sunlight. Hydrogen production is shown in Table IV below.

TABLE IV

Photo-Assisted Decomposition of Formate Using Mo(CO)$_6$

| Status | Time | T (°C.) | ml H$_2$ |
|---|---|---|---|
| Dark | 12:50 p.m. | 62 | 0.0419 |
| " | 1:10 p.m. | 55 | 0.0533 |
| " | 1:20 p.m. | 56 | 0.0571 |
| Reaction taken out into sunlight at 1:30 p.m. | | | |
| Illuminated | 1:40 p.m. | 52 | 0.0724 |
| " | 1:50 p.m. | 53 | 0.0895 |
| " | 2:20 p.m. | 50 | 0.173 |
| " | 2:50 p.m. | 52 | 0.272 |
| " | 3:20 p.m. | 52 | 0.360 |

EXAMPLE V

Photo-Assisted Decomposition of Formate Using Mo(CO)$_6$

In Example V 200 ml. of 25% H$_2$O-75% Cellosolve V/V, 0.0311 g, Mo(CO)$_6$, and 2.6983 g NaHCO$_2$, at a temperature of approximately 70° C. is exposed to sunlight. Hydrogen production is shown in Table V below:

TABLE V

Photo-Assisted Decomposition of Formate Using Mo(CO)$_6$

| Status | Time | T (°C.) | ml H$_2$ |
|---|---|---|---|
| Dark | 1:00 p.m. | 74 | 0.0533 |
| " | 1:20 p.m. | 73 | 0.105 |
| " | 1:30 p.m. | 70 | 0.133 |
| Reaction taken out into sunlight at 1:40 p.m. | | | |
| Illuminated | 1:50 p.m. | 70 | 0.200 |
| " | 2:00 p.m. | 69 | 0.305 |
| " | 2:20 p.m. | 69 | 0.554 |
| " | 2:40 p.m. | 70 | 0.819 |
| " | 3:00 p.m. | 70 | 0.975 |
| " | 3:40 p.m. | 70 | 1.45 |
| " | 4:00 p.m. | 70 | 1.61 |

EXAMPLE VI

Photo-Assisted Decomposition of Formate Using Mo(CO)$_6$

In Example VI 200 ml. of 25% H$_2$O-75% Cellosolve V/V, 0.0332 g Mo(CO)$_6$, and 2.7005 g NaHCO$_2$, at a temperature of approximately 80° C. is exposed to sunlight. Hydrogen production is shown in Table VI below.

TABLE VI

Photo-Assisted Decomposition of Formate Using Mo(CO)$_6$

| Status | Time | T (°C.) | ml H$_2$ |
|---|---|---|---|
| Dark | 1:50 p.m. | 82 | 0.0438 |
| " | 2:00 p.m. | 80 | 0.116 |
| " | 2:10 p.m. | 80 | 0.179 |
| Reaction taken out into sunlight at 2:15 p.m. | | | |
| Illuminated | 2:20 p.m. | 78 | 0.284 |
| " | 2:40 p.m. | 80 | 0.691 |
| " | 3:00 p.m. | 80 | 1.14 |
| " | 3:20 p.m. | 80 | 1.65 |
| " | 3:40 p.m. | 81 | 2.06 |

EXAMPLE VII

Photo-Assisted Decomposition of Formate Using W(CO)$_6$

In Example VII 200 ml. of 25% H$_2$O-75% Cellosolve V/V, 0.0421 g W(CO)$_6$, and 2.699 g NaHCO$_2$, at a temperature of approximately 63° C. is exposed to sunlight. Hydrogen production is shown in Table VII below.

TABLE VII

Photo-Assisted Decomposition of Formate Using W(CO)$_6$

| Status | Time | T (°C.) | ml H$_2$ |
|---|---|---|---|
| Dark | 4:30 p.m. | 61 | 0.012 |
| " | 4:40 p.m. | 61 | 0.023 |
| " | 4:55 p.m. | 61 | 0.030 |
| Reaction taken out into sunlight at 4:57 p.m. | | | |
| Illuminated | 5:00 p.m. | 64 | 0.040 |
| " | 5:10 p.m. | 67 | 0.25 |
| " | 5:20 p.m. | 64 | 0.83 |
| " | 5:30 p.m. | 64 | 1.54 |
| " | 5:40 p.m. | 64 | 2.13 |
| " | 6:00 p.m. | 63 | 3.67 |
| " | 6:30 p.m. | 65 | 5.03 |
| " | 7:00 p.m. | 65 | 6.28 |
| " | 7:30 p.m. | 62 | 6.90 |
| Sunset at approximately 7:30 p.m. | | | |
| Dark | 10:55 p.m. | 65 | 10.3 |

EXAMPLE VIII

Photo-Assisted Decomposition of Formate Using W(CO)$_6$

In Example VIII 200 ml. of 25% H$_2$O-75% Cellosolve V/V, 0.0137 g W(CO)$_6$, and 2.6967 g NaHCO$_2$, at a temperature of approximately 75° C. is exposed to sunlight. Hydrogen and carbon dioxide production are shown in Table VIII below.

TABLE VIII

Photo-Assisted Decomposition of Formate Using W(CO)$_6$

| Status | Time | T (°C.) | ml H$_2$ | ml CO$_2$ |
|---|---|---|---|---|
| Dark | 12:05 p.m. | 69 | 0.011 | |
| " | 12:15 p.m. | 71 | | 0.098 |
| " | 12:35 p.m. | 75 | 0.091 | |
| " | 1:20 p.m. | 75 | 0.278 | |
| " | 1:25 p.m. | 75 | | 0.868 |
| " | 1:44 p.m. | 75 | 0.370 | |
| " | 1:46 p.m. | 75 | | 0.921 |
| Reaction taken out into sunlight at 1:49 p.m. | | | | |
| Illuminated | 1:57 p.m. | 75 | 0.481 | |
| " | 2:00 p.m. | 75 | | 1.11 |
| " | 2:15 p.m. | 75 | 1.70 | |
| " | 2:18 p.m. | 75 | | 2.37 |
| " | 2:45 p.m. | 75 | 3.46 | |
| " | 2:47 p.m. | 75 | | 5.03 |
| " | 3:15 p.m. | 75 | 5.91 | |
| " | 3:17 p.m. | 75 | | 7.15 |
| " | 4:03 p.m. | 75 | 8.35 | |
| " | 4:05 p.m. | 75 | | 10.14 |
| " | 4:40 p.m. | 75 | 11.6 | |
| " | 4:42 p.m. | 75 | | 11.7 |
| " | 5:11 p.m. | 75 | 12.8 | |
| " | 5:13 p.m. | 75 | | 13.6 |
| " | 6:25 p.m. | 75 | 18.0 | |

EXAMPLE IX

Photo-Assisted Decomposition of Formate Using W(CO)$_6$

In Example IX 200 ml. of 25% H$_2$O-75% Cellosolve V/V, 0.0420 g W(CO)$_6$, and 2.7004 g NaHCO$_2$, at a temperature of approximately 95° C. is exposed to sunlight. Hydrogen production is shown in Table IX below:

TABLE IX

Photo-Assisted Decomposition of Formate Using W(CO)$_6$

| Status | Time | T (°C.) | ml H$_2$ |
|---|---|---|---|
| Dark | prior to exposure | 50 | 0.009 |
| Reaction taken out into sunlight at 4:35 p.m. | | | |
| Illuminated | 4:53 p.m. | 97 | 0.628 |
| " | 5:06 p.m. | 93 | 9.76 |
| " | 5:13 p.m. | 95 | 12.8 |
| " | 5:20 p.m. | 93 | 15.5 |
| " | 5:25 p.m. | 95 | 17.5 |
| " | 5:32 p.m. | 95 | 22.0 |

The foregoing examples illustrate specific embodiments within the scope of this invention and are not to be construed as limiting said scope. While the invention has been described herein with regard to certain specific embodiments, it is not so limited. It is to be understood that variations and modifications thereof may be made by those skilled in the art without departing from the scope of the invention.

What is claimed is:

1. A process for producing hydrogen from formate and water wherein an active formate decomposition catalyst is photogenerated from a transition metal carbonyl having a formula M(CO)$_6$ using near ultraviolet light under oxygen free conditions at a temperature of 45° C. and above.

2. A process according to claim 1 wherein M is selected from the group consisting of chromium, molybdenum, and tungsten.

3. A process according to claim 2 wherein the near ultraviolet light is sunlight.

4. A process according to claim 3 carried out with a solvent selected from the group consisting of hydroxylic solvents and transparent water/oil microemulsions.

5. A process according to claim 4 wherein the hydroxylic solvent is selected from the group consisting of 2-ethoxy ethanol (Cellosolve), 2-(2-ethoxy ethoxy) ethanol (Methyl Carbitol), propylene glycol monomethyl ether (UCAR Solvent LM), and triethylene glycol.

6. A process according to claim 4 wherein the solvent comprises 75% V/V of a reaction mixture.

7. A process according to claim 1 wherein formate is generated from carbon monoxide and hydroxide in a basic solution wherein the process is the water gas shift reaction.

8. A process according to claim 7 wherein M is selected from the group consisting of chromium, molybdenum, and tungsten.

9. A process according to claim 8 wherein the near ultraviolet light is sunlight.

10. A process according to claim 9 carried out with a solvent selected from the group consisting of hydroxylic solvents and transparent water/oil microemulsions.

11. A process according to claim 10 wherein the hydroxylic solvent is selected from the group consisting of 2-ethoxy ethanol (Cellosolve), 2-(2-ethoxy ethoxy) ethanol (Methyl Carbitol), propylene glycol monomethyl ether (UCAR Solvent LM), and triethylene glycol.

12. A process according to claim 10 wherein the solvent comprises 75% V/V of a reaction mixture.

* * * * *